Figures 1, 2, 3:
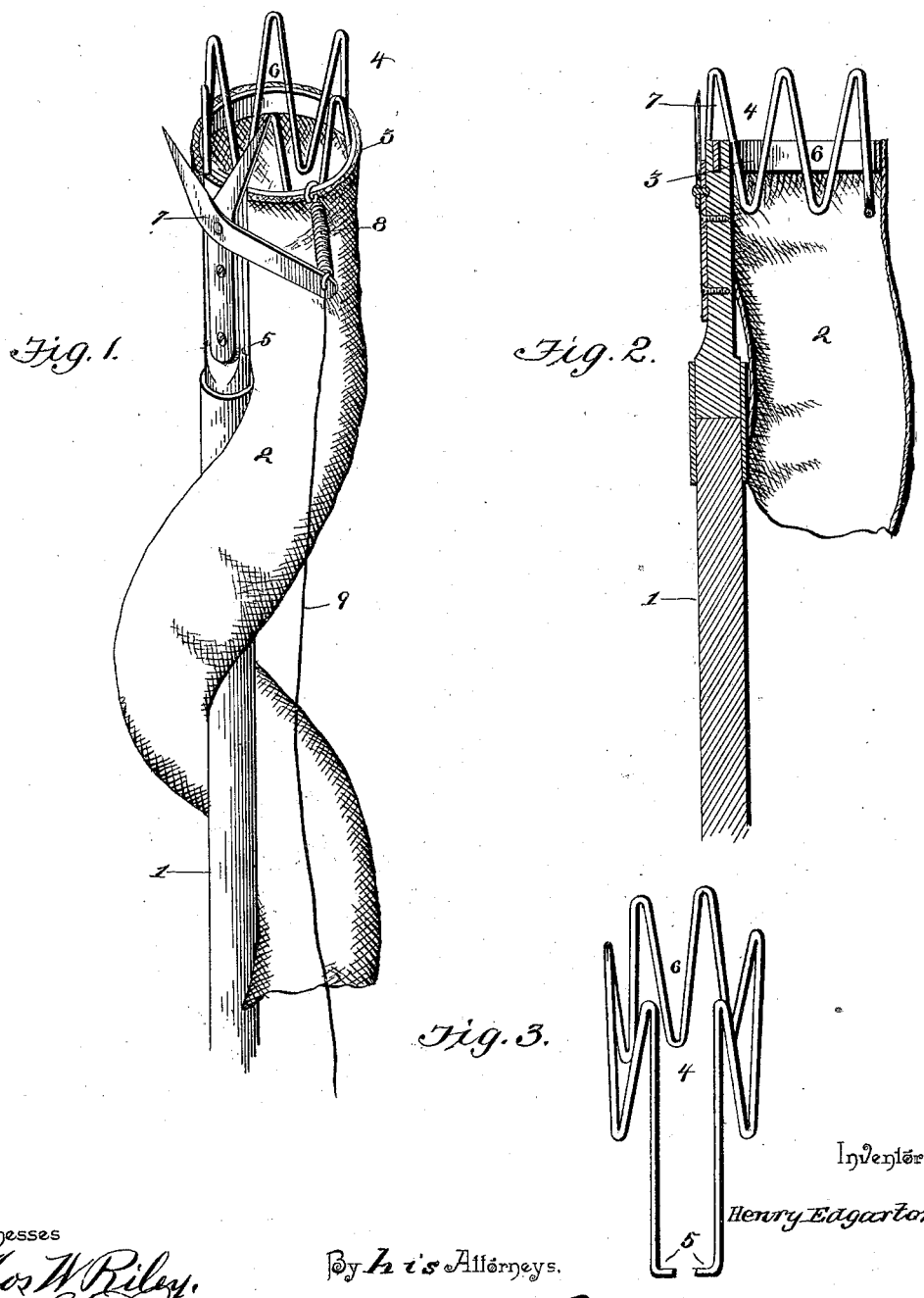

(No Model.)

H. EDGARTON.
FRUIT GATHERER.

No. 561,575. Patented June 9, 1896.

Witnesses
Thos. W. Riley.
N. W. Riley.

By his Attorneys,
C. A. Snow & Co.

Inventor
Henry Edgarton.

UNITED STATES PATENT OFFICE.

HENRY EDGARTON, OF SHIRLEY, MASSACHUSETTS.

FRUIT-GATHERER.

SPECIFICATION forming part of Letters Patent No. 561,575, dated June 9, 1896.

Application filed August 15, 1894. Serial No. 520,415. (No model.)

*To all whom it may concern:*

Be it known that I, HENRY EDGARTON, a citizen of the United States, residing at Shirley, in the county of Middlesex and State of Massachusetts, have invented a new and useful Fruit-Gatherer, of which the following is a specification.

The invention relates to improvements in fruit-gatherers.

The object of the present invention is to improve the construction of fruit-gatherers, to increase their efficiency, and to enable fruit to be rapidly gathered and conveyed from a tree to a basket without injury to it.

The invention consists in the construction and novel combination and arrangement of parts hereinafter fully described, illustrated in the accompanying drawings, and pointed out in the claim hereto appended.

In the drawings, Figure 1 is a perspective view of a fruit-gatherer constructed in accordance with this invention. Fig. 2 is a vertical sectional view of the same. Fig. 3 is a detail perspective view of the circular wire frame arranged at the mouth of the chute.

Like numerals of reference indicate corresponding parts in all the figures of the drawings.

1 designates a pole having attached to it a spirally-coiled fabric chute 2, which has its upper end or mouth spread by a ring or collar 3, secured to the top of the pole within a notch formed therein. Within the ring or collar is arranged a lower portion of a circular picking-frame 4, which is constructed of a single piece of wire having parallel vertically-disposed terminals provided with studs 5, embedded in opposite sides of the upper end of the pole, said wire being continuously bent from the upper ends of the parallel terminals to form a series of V-shaped portions 6, connected at the top. The V-shaped portions provide a series of fingers and form tapering mouths or openings to receive the stems of fruit, whereby the latter is readily separated from the tree and is delivered to the operator through the chute. This construction also forms an annular series of depending fingers, which are located within the chute and which project below the ring, and which serve to hold the chute spread or open at its upper end and to counteract any tendency of the spiral coiling of the chute closing its upper end.

The majority of fruit when ripe is readily picked and requires but little force to free it from its stem; but in order to facilitate the gathering of pears, oranges, and the like, which are more difficult to pick, a pair of clipper-blades or shears 7 is provided. One of the blades is secured to the pole and the other is pivotally mounted and has its cutting portion held separated from the other blade by a spring 8. The clippers or shears are operated by a cord 9, which is connected to the lower end of the pivoted blade.

The fruit is retarded in its descent in the chute, to avoid bruising or otherwise injuring it, by spirally coiling the chute 2 loosely around the pole 1. By this arrangement the fruit may be readily delivered into a basket carried by the operator without liability of injuring it, and by tightening or freeing the chute the descent of the fruit may be readily regulated.

It will be seen that the fruit-gatherer is simple and comparatively inexpensive in construction and that it is capable of readily picking fruit and of delivering the same from a tree to the operator without bruising or otherwise injuring it.

Changes in the form, proportion, and the minor details of construction may be resorted to without departing from the principle or sacrificing any of the advantages of this invention.

What I claim is—

In a fruit-gatherer, a pole provided in its upper end with a notch, a ring mortised at one side in said notch and projected laterally from the pole at substantially right angles thereto, a flexible chute attached at its upper end to said laterally-projected ring, a picking-frame formed of a single length of wire having parallel vertically-disposed terminals arranged at opposite sides of the pole and provided with studs embedded in the pole, said wire being continuously bent from the upper ends of the parallel terminals to form a series of connected V-shaped fingers arranged entirely inside of said ring and projecting a distance above and below the same, the portions of said fingers above the ring serving as picking-fingers and the portions below the ring serving to spread the upper end of the chute, and a manually-controlled cutter arranged on the upper end of the pole directly opposite the space between the parallel terminals of the picking-frame, substantially as set forth.

In testimony that I claim the foregoing as my own I have hereto affixed my signature in the presence of two witnesses.

HENRY EDGARTON.

Witnesses:
CHARLES F. FLAGG,
GEO. W. SANDERSON.